UNITED STATES PATENT OFFICE.

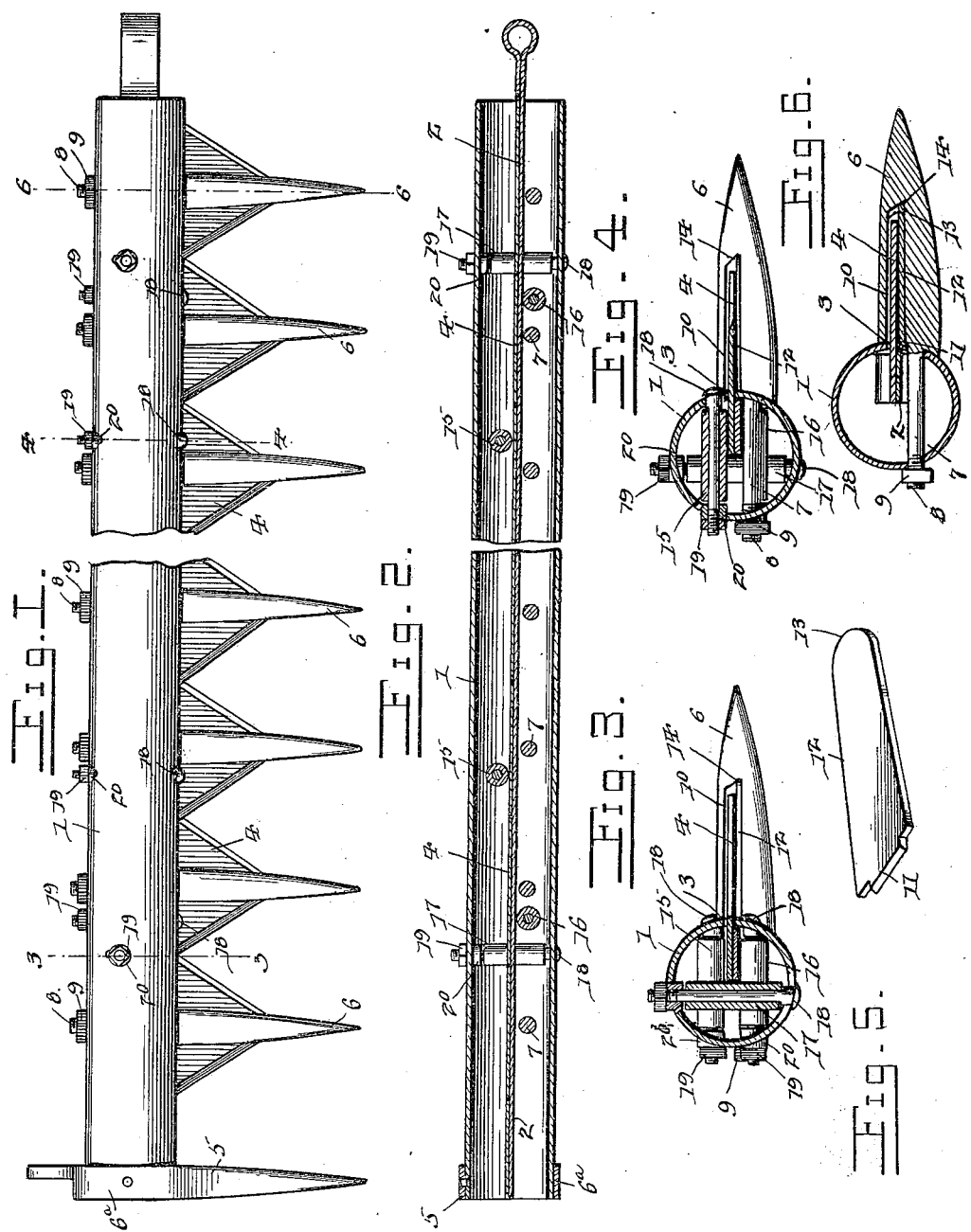

ALBERT J. HARRISON, OF LUXOR, MISSOURI.

CUTTING APPARATUS.

SPECIFICATION forming part of Letters Patent No. 663,541, dated December 11, 1900.

Application filed March 26, 1900. Serial No. 10,217. (No model.)

*To all whom it may concern:*

Be it known that I, ALBERT J. HARRISON, a citizen of the United States, residing at Luxor, in the county of Macon and State of Missouri, have invented a new and useful Cutting Apparatus, of which the following is a specification.

The invention relates to improvements in cutting apparatus.

The objects of the present invention are to improve the construction of cutting apparatus, more especially the means for mounting the sickle or cutter bar on the finger-bar, and to enable the cutter or sickle bar to be inclosed or incased within a tubular finger-bar to protect it from dirt and to prevent it from gumming without increasing the wear or friction and without causing it to drag.

The invention consists in the construction and novel combination and arrangement of parts hereinafter fully described, illustrated in the accompanying drawings, and pointed out in the claims hereto appended.

In the drawings, Figure 1 is a plan view of a cutting apparatus constructed in accordance with this invention. Fig. 2 is a longitudinal sectional view of the same. Figs. 3 and 4 are transverse sectional views on lines 3 3 and 4 4 of Fig. 2. Fig. 5 is a detail perspective view of the ledger-plate. Fig. 6 is a transverse sectional view on line 6 6 of Fig. 1.

Like numerals of reference designate corresponding parts in all the figures of the drawings.

1 designates a tubular finger-bar forming a casing for a reciprocating sickle or cutting bar 2 and adapted to protect the same from dust and dirt and capable of also preventing the parts from gumming. The tubular finger-bar, which may be constructed of any suitable tubular metal, is provided at its front with a longitudinal slot 3, through which extend the knives or blades 4 of the sickle or cutter bar. The outer end of the tubular finger-bar is provided with a shoe 5, having a ring portion $6^a$, which receives the finger-bar, and the inner end of the latter may be provided with any form of shoe and with any character of hinge for connecting it with the frame or member of the machine in which the cutting apparatus is employed. The inner end of the sickle or cutter bar is provided with an eye designed to be connected with a pitman in the usual manner, and the blades or knives 4 may be secured to the sickle or cutter bar in any suitable manner. The finger-bar is provided at intervals with guard-fingers 6, having rearwardly-extending longitudinally-disposed shanks 7, extending through perforations of the front and back of the finger-bar at points below the slot 3 and threaded at their rear ends at 8 for the reception of nuts 9. The shoulders formed by reducing the guard-fingers to provide the shanks 7 abut against the front of the finger-bar, and the nuts 9 engage the rear face of the finger-bar and firmly hold the guard-fingers thereon. The guard-fingers are provided with longitudinal slots or openings 10, receiving the knives or blades 4 and registering with the slot or opening 3 of the finger-bar. The lower portion of the finger-bar is recessed at the top of the front perforations to receive rear lugs 11 of ledger-plates 12, which are arranged at the bottom of the slots or openings 10 beneath the knives or blades 4, and the front ends 13 of the ledger-plates are rounded and fit in corresponding sockets 14, located at the front of the slot or opening 10, whereby the front ends of the ledger-plates are interlocked with the front portion of the guard-fingers. The nuts 9 of the shanks of the guard-fingers hold the ends of the ledger-plates firmly interlocked with the finger-bar and with the front portions of the guard-fingers.

In order to enable the cutter-bar to reciprocate freely and frictionlessly and to prevent the same from dragging, the finger-bar is provided with upper and lower horizontal rollers 15 and 16 and vertical rear rollers 17. These rollers preferably consist of sleeves mounted upon bolts which extend through perforations of the finger-bar. Each bolt is provided at one end with a head 18, and its other end is threaded for the reception of a nut 19, and the threaded end also receives a sleeve 20, which fills the perforation or opening through which the antifriction sleeve or roller is introduced into the finger-bar. The horizontal rollers support the cutter-bar clear of the shanks of the guard-fingers, the upper horizontal rollers prevent the cutter-bar from rising and twisting, and the rear vertical rollers prevent the cutter-bar from dragging.

The heads of the horizontal bolts of the antifriction-rollers are preferably arranged at the front of the finger-bar to locate the bolts at the back of the same, and the bolts of the vertical antifriction-rollers have their nuts at the upper face of the finger-bar.

It will be seen that the cutting apparatus is simple and comparatively inexpensive in construction, that the cutter or sickle bar is housed within the tubular finger-bar and is protected from dirt and prevented from gumming, and that the antifriction-rollers prevent the cutter or sickle bar from dragging or twisting and reduce the wear to a minimum. It will also be apparent that only one nut is required for securing the guard-finger and ledger-plate to the finger-bar and to each other.

What is claimed is—

1. In an apparatus of the class described, the combination of a tubular finger-bar provided at its front with a longitudinal slot, guard-fingers detachably secured to the finger-bar and having shanks extending rearward through the same, a cutter or sickle bar located within the tubular finger-bar and provided with knives or blades extending outward through the said slot, and the vertical and horizontal antifriction-rollers located within the tubular finger-bar and arranged respectively at the back and above and below the cutter or sickle bar and supporting the same out of contact with the shanks of the guard-fingers, substantially as described.

2. In an apparatus of the class described, the combination of a tubular finger-bar having guard-fingers, a reciprocating sickle or cutter bar located within the finger-bar and provided with knives or blades, and the antifriction-rollers located within the finger-bar and arranged contiguous to the cutter or sickle bar and each consisting of a sleeve, a bolt supporting the sleeve, and an end sleeve located adjacent to the nut of the bolt and filling the adjacent perforation or opening of the finger-bar, substantially as described.

3. In an apparatus of the class described, the combination of a finger-bar, a cutter or sickle bar having knives or blades, a guard-finger having a shank extending through the finger-bar, a ledger-plate interlocked with the front portion of the guard-finger and with the front of the finger-bar, and a fastening device arranged at the rear end of the shank of the guard-finger and securing the latter and the ledger-plate in place, substantially as described.

4. In an apparatus of the class described, the combination of a finger-bar, a guard-finger provided at its front portion with a recess and having a shank extended through the finger-bar and threaded, a ledger-plate interlocked at its front end with the guard-finger at the recess thereof and provided at its rear end with a lug interlocked with the finger-bar, and a nut arranged on the threaded end of the shank and engaging the finger-bar, whereby the guard-finger and the ledger-plate are held in place, substantially as described.

In testimony that I claim the foregoing as my own I have hereto affixed my signature in the presence of two witnesses.

ALBERT J. HARRISON.

Witnesses:
Q. B. HOLBECK,
R. B. TURNER.